(12) United States Patent
Hyatt et al.

(10) Patent No.: US 9,427,843 B2
(45) Date of Patent: Aug. 30, 2016

(54) MEASURING APPARATUS AND METHOD

(75) Inventors: Gregory A. Hyatt, South Barrington, IL (US); Nitin Chaphalkar, Mount Prospect, IL (US)

(73) Assignee: Mori Seiki Co., LTD, Nara (JP)

( * ) Notice: Subject to any disclaimer, the term of this patent is extended or adjusted under 35 U.S.C. 154(b) by 325 days.

(21) Appl. No.: 13/037,589

(22) Filed: Mar. 1, 2011

(65) Prior Publication Data

US 2011/0209529 A1 Sep. 1, 2011

Related U.S. Application Data

(63) Continuation-in-part of application No. 12/035,325, filed on Feb. 21, 2008, now abandoned.

(51) Int. Cl.
| | | |
|---|---|---|
| *B24B 49/08* | (2006.01) | |
| *B24B 49/04* | (2006.01) | |
| *B26F 3/00* | (2006.01) | |
| *G01B 13/10* | (2006.01) | |
| *B26D 5/00* | (2006.01) | |

(52) U.S. Cl.
CPC ............. *B24B 49/04* (2013.01); *B24B 49/08* (2013.01); *B26F 3/004* (2013.01); *G01B 13/10* (2013.01); *B26D 5/00* (2013.01)

(58) Field of Classification Search
CPC .............................. G01B 13/08; G01B 13/10
USPC ........ 73/37, 37.5, 37.6, 37.8, 37.9; 33/543.1
See application file for complete search history.

(56) References Cited

U.S. PATENT DOCUMENTS

| | | | |
|---|---|---|---|
| 2,751,778 A * | 6/1956 | Mennesson | .................... 73/37.9 |
| 2,777,257 A | 1/1957 | Johnson et al. | |
| 3,543,779 A | 12/1970 | Eckerlin et al. | |
| 3,682,191 A | 8/1972 | Lechner | |
| 3,792,605 A * | 2/1974 | Rabenau | ........................ 73/37.9 |
| 3,895,516 A * | 7/1975 | Swartz | ............................ 73/37.6 |
| 4,977,777 A * | 12/1990 | Bieg | ........................... 73/37.5 |
| 5,152,166 A * | 10/1992 | Brock et al. | ................... 73/37.9 |
| 5,212,980 A * | 5/1993 | Wegmann | ..................... 73/37.9 |
| 5,789,661 A | 8/1998 | Fauque et al. | |
| 5,800,252 A * | 9/1998 | Hyatt | .............................. 451/61 |
| 5,884,847 A * | 3/1999 | Christopher | .................. 239/390 |
| 6,553,891 B2 * | 4/2003 | Fiebing et al. | ................ 92/12.2 |

(Continued)

*Primary Examiner* — Peter Macchiarolo
*Assistant Examiner* — Alexander Mercado
(74) *Attorney, Agent, or Firm* — Miller, Matthias & Hull LLP

(57) ABSTRACT

An apparatus for obtaining information about a workpiece may include a measuring device having a nozzle defining an orifice in fluid communication with a source of incompressible fluid. A fluid monitoring apparatus may monitor a parameter of the substantially incompressible fluid, and a pump may be fluidly coupled to the source and configured to supply incompressible fluid to the orifice. The pump may have a pump chamber with a first displacement setting having a first fixed volume, so that operation of the pump at a first pump speed with the pump chamber in the first displacement setting generates a first fluid flow having a substantially constant first volumetric rate. The pump may have more than one displacement setting, or the pump may be operated at different speeds to change the volumetric flow rate. The nozzle may include multiple, independent orifice sets that may be selectively provided fluid, thereby to obtain information on different parts of the workpiece with a single placement of the nozzle. Additionally, the apparatus may be incorporated into a CNC machine to perform simultaneous measurement and machining operations.

19 Claims, 15 Drawing Sheets

(56) References Cited

U.S. PATENT DOCUMENTS

| | | |
|---|---|---|
| 6,901,797 B2 | 6/2005 | Hyatt et al. |
| 8,479,564 B2* | 7/2013 | Fujimura ............ 73/37.9 |
| 8,485,021 B2* | 7/2013 | Fujimura ............ 73/37.5 |
| 2002/0069547 A1* | 6/2002 | Hyatt et al. ......... 33/542 |
| 2004/0136833 A1* | 7/2004 | Allington et al. ...... 417/44.1 |
| 2006/0188616 A1* | 8/2006 | Pierce et al. ......... 426/231 |
| 2007/0240324 A1* | 10/2007 | Weier ............... 33/701 |
| 2008/0219781 A1* | 9/2008 | Hyatt et al. ......... 407/11 |
| 2011/0023584 A1* | 2/2011 | Fujimura ............ 73/37.5 |

* cited by examiner

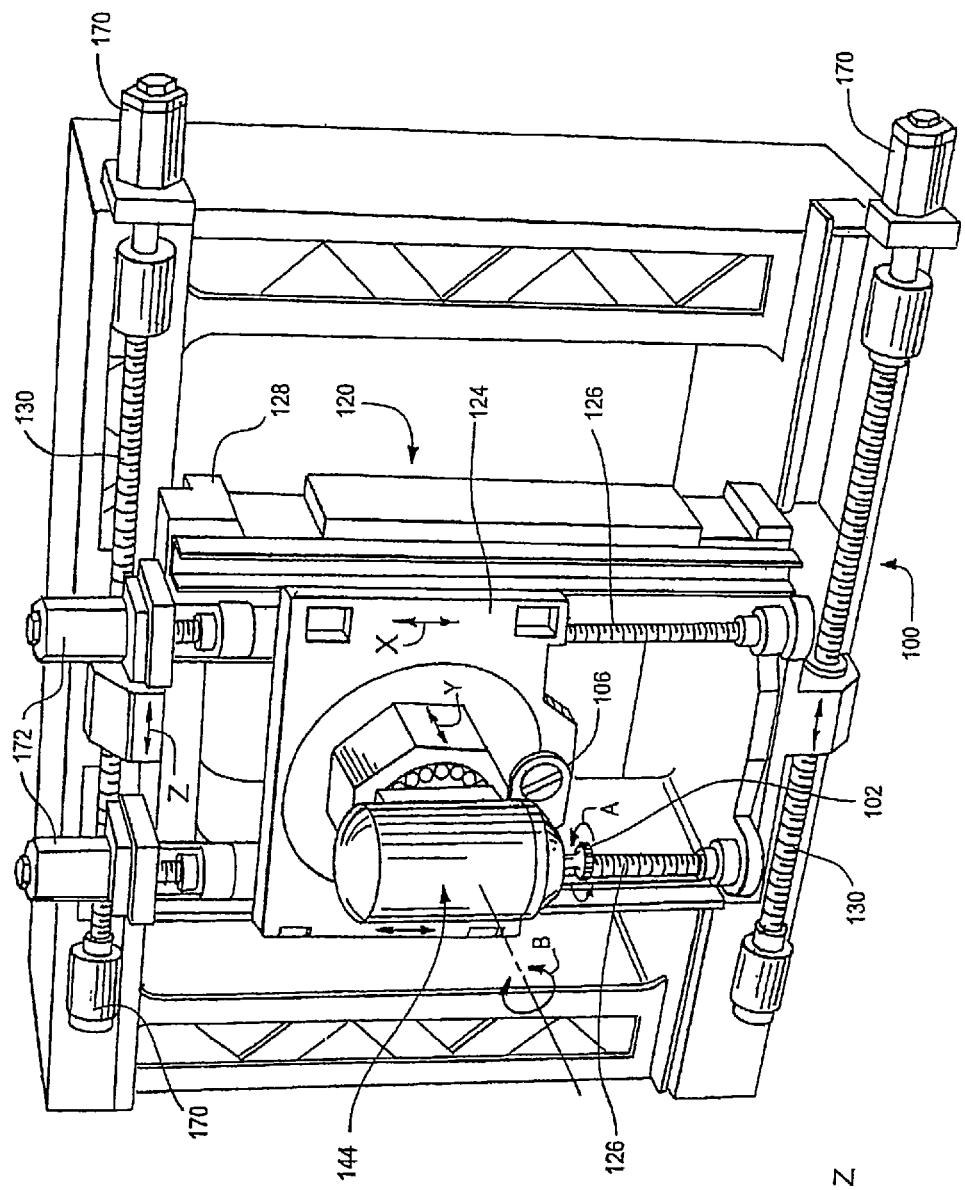
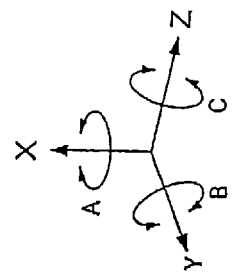
Fig. 4

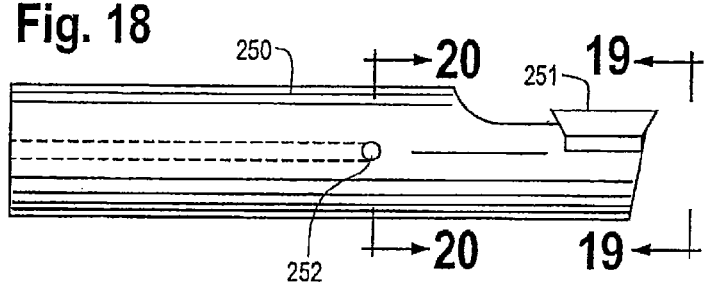
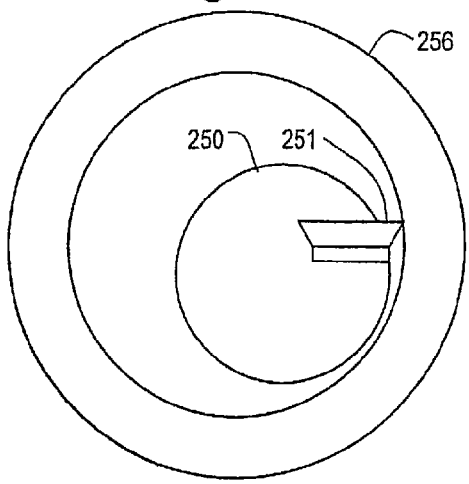
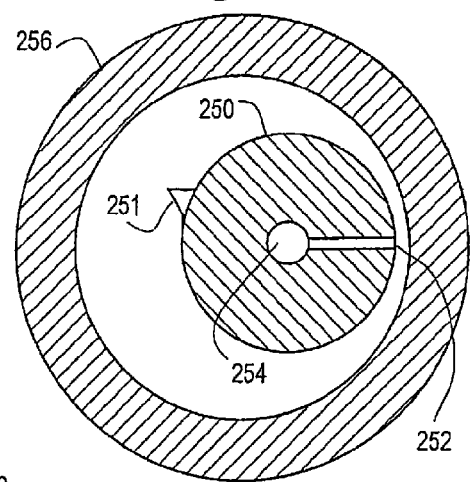
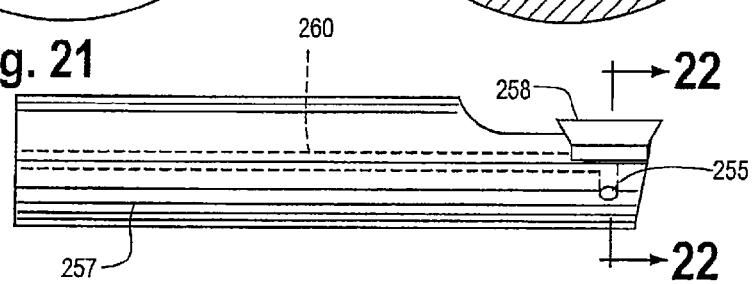
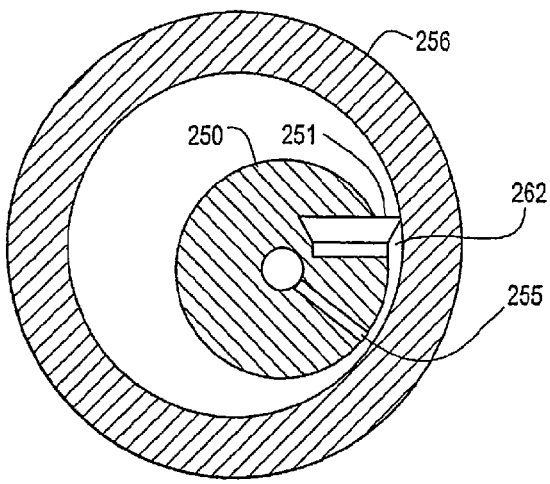

MEASURING APPARATUS AND METHOD

CROSS-REFERENCE TO RELATED APPLICATION

This application is a continuation in part of U.S. patent application Ser. No. 12/035,325, filed on Feb. 21, 2008, which is incorporated herein by reference.

BACKGROUND

1. Technical Field

This disclosure generally relates to measuring devices and, more particularly, to measuring devices and methods used on computer numerically controlled machines.

2. Description of the Related Art

Computer numerically controlled machines are widely used to cut forms of metal and other materials in operations such as milling, drilling, grinding, broaching, turning, and the like (such operations being termed "cutting operations" generally). In most cases, and in particular when cutting high-precision forms such as gears and engine parts, there is a need to measure the item being cut and/or the tool used in the machine. Such measuring may be conducted either during or after the cutting operation, and may be performed inside or outside of the machine. Measuring generally is conducted to determine whether the size of the form or tool is within a desired degree of tolerance or to determine proper adjustments to the cutting operation. In particular, measurement during a cutting operation is desirable because it allows corrections to be made more rapidly.

Generally, measurements may be taken either within the CNC machine or externally after removal of the item to be measured from the machine. External measurement, while often useful, is disfavored for a number of reasons. External measurements can make it difficult to conduct extended unattended operations, particularly if tool wear is high. In offline gauging, the part is measured outside the machine after machining is complete. Typically, this is carried out in a separate temperature-controlled room. If a machine is kept running during the measuring step, and if the measured part should prove to be out of tolerance, the machine will have kept producing out-of-tolerance parts. It is common, therefore, for machining to cease until the part measurement is complete, thus reducing productivity of the operation. Additionally, if the workpiece is out of tolerance, an adjustment in the tool offset or insert position is required. Depending on the measurement taken in the measuring step, an operator may need to calculate the necessary adjustment and adjust the machine. This can lead to operator error and additional production of out-of-tolerance parts.

In many cases, multiple machines are employed to produce the same part. In this case, operators need to keep track of which parts came from which machine, thus possibly leading to confusion.

The prior art has provided automotive measuring offline gauging systems which can provide automatic feedback. Such systems are typically expensive and complicated.

Conversely, many known in-machine measurement systems are unsatisfactory. There is often a trade-off between robustness of the device and accuracy of measurement. For instance, touch probes, which are suitable for some purposes, in many cases are not sufficiently accurate for high-precision work. This is in part because touch probes depend on the accuracy of the machine. Additionally, touch probes have longer measurement cycles than other measurement devices, and accordingly they are less productive. Other devices, including air gages and linear variable differential transformers (LVDTs), in some cases are not sufficiently robust to withstand the harsh environment within a CNC machine. They are subject to contamination due to swarf, and may lead to incorrect measurements.

One of the inventors of the present application earlier devised a measuring device (certain embodiments of which are disclosed in U.S. Pat. No. 6,901,797) that attempts to address the foregoing. The device disclosed in the '797 patent employs an incompressible fluid, typically a liquid, to achieve an in-machine measurement using known pneumatic measuring techniques. Applicants have identified shortcomings in that device that are addressed by the methods and apparatus described and claimed herein.

SUMMARY OF THE DISCLOSURE

It has been found that a CNC machine may be supplied with a measuring device that includes a nozzle and a source of incompressible fluid. The fluid may be delivered to the nozzle during the course of taking a measurement reading. By measuring the pressure of the fluid as the nozzle is moved into proximity with the item to be measured, a measurement parameter may be determined. The measurement parameter may be, for instance, a dimension of the item being measured, the center position of a bore, the centerline of an item, or any other suitable measurement parameter. The fluid may be delivered at a constant volumetric flow rate during the course of taking a measurement reading. The measurement parameter so measured may be used in many ways; for instance, in adjusting total offsets, re-cutting a workpiece, determining whether a workpiece is within specification, or causing another program to run.

According to certain aspects of this disclosure, an apparatus may include a first holder and at least one tool holder, the first holder and tool holder being movable with respect to one another, and a computer control system that is operatively connected to the first holder and to the tool holder. A measuring device that includes a nozzle having at least one orifice is also provided, the nozzle being disposable in the tool holder. The measuring device includes a source of a substantially incompressible fluid, the source being in fluid communication with, or fluidically communicable with, the nozzle. The measuring device is further equipped with a fluid pumping device that is configured to supply at least a portion of the fluid at a constant volumetric flow rate to the nozzle during a measuring operation, and a device for measuring the pressure of the fluid and for communicating electronic information relating to the pressure to a computing device. The computing device, which may be the heretofore referenced machine computer control system or a separate computing device, is configured to determine a measurement parameter for an item that is disposed in the first holder. The computing device may be, for instance, a microcontroller or other controller. The item to be measured may be, for instance, a workpiece, a tool, or a calibration device as hereinafter described. The apparatus is not limited to a CNC machine.

According to additional aspects, an apparatus for obtaining information about a workpiece may include a first holder configured to support the workpiece, a second holder movable relative to the first holder, and a computer control system operatively coupled to the first holder and the second holder and including a computer readable medium having disposed thereon executable code which, when executed, is configured to cause relative movement of the first holder and the second holder. A measuring device may be provided that includes a source including substantially incompressible fluid, a nozzle disposed in the second holder and defining an orifice, the orifice fluidly communicating with the source, a fluid monitoring apparatus associated with the measuring device for monitoring a parameter of the substantially incompressible fluid, and a pump fluidly coupled to the to the source and configured to supply incompressible fluid to the orifice. The pump may have a pump chamber with a first displacement setting having a first fixed volume, so that operation of the pump at a first pump speed with the pump chamber in the first displacement setting generates a first fluid flow having a substantially constant first volumetric rate.

According to further aspects of this disclosure, an apparatus for obtaining information about a workpiece may include a first holder configured to support the workpiece, a second holder movable relative to the first holder, and a computer control system operatively coupled to the first holder and the second holder and including a computer readable medium having disposed thereon executable code which, when executed, is configured to cause relative movement of the first holder and the second holder. A measuring device may have a source including substantially incompressible fluid and a nozzle coupled to the second holder. The nozzle may define a first nozzle conduit fluidly communicating between a first nozzle inlet and a first nozzle orifice, and a second nozzle conduit fluidly communicating between a second nozzle inlet and a second nozzle orifice, the first nozzle conduit being separate from the second nozzle conduit, wherein the first nozzle inlet is spaced from the second nozzle inlet. An adapter may be slidably coupled to the nozzle, the adapter including an adapter conduit having an adapter inlet fluidly communicating with the source and an adapter outlet. The adapter may be movable between a first position, in which the adapter outlet fluidly communicates with the first nozzle inlet, and a second position, in which the adapter outlet fluidly communicates with the second nozzle inlet. A fluid monitoring apparatus may be associated with the measuring device for monitoring a parameter of the substantially incompressible fluid. A pump may be fluidly coupled to the source and configured to supply incompressible fluid to the adapter inlet.

According to yet additional aspects, a method of obtaining information about a workpiece as the workpiece is machined may include providing a measuring device having a source of substantially incompressible fluid, a nozzle defining an orifice in fluid communication with the source, a fluid monitoring apparatus for monitoring a parameter of the substantially incompressible fluid, and a pump fluidly coupled to the source and configured to supply incompressible fluid to the orifice. Additionally, a cutting tool may be provided that is configured to remove material from the workpiece. The method may include securing the workpiece in a first holder, securing the nozzle in a second holder, and securing the cutting tool in a third holder, wherein the second and third holders are supported for movement relative to the first holder. A measurement operation may be performed that includes moving the second holder relative to the first holder to position the nozzle orifice proximal to the workpiece, dispersing incompressible fluid from the source through the nozzle orifice to contact the workpiece, and monitoring the parameter of the substantially incompressible fluid as the fluid contacts the workpiece. A machining operation may be performed simultaneously with the measurement operation, the machining operation including moving the third holder relative to the first holder to place the cutting tool in contact with the workpiece, and moving at least one of the first holder and the third holder so that the cutting tool removes material from the workpiece.

Measurement simultaneously with removal of material can provide a number of advantages. For instance, the removal of the material may be terminated if a predetermined error limit has been surpassed (the error limit intended to indicate a problem, such as breakage of the tool or an out-of-specification workpiece). In other embodiments, removal of material from workpiece, or from a portion of the workpiece, is caused to cease when the measuring device determines that sufficient material has been removed from the workpiece. Still further, simultaneous measuring while machining may facilitate operations in which the cutting tool experiences significant wear, such as when forming relatively long or large parts. In such operations, the diameter of the cutting tool may be reduced and therefore may be less precise in its cutting operation. Simultaneous measurement during the machining operation will identify imprecision and permit adjustment of the tool path to accommodate wear of the cutting tool. An apparatus that contains computer-executable code for accomplishing the foregoing may be provided.

Other methods and apparatus as provided include an integrated cutting tool and nozzle. For instance, a cutting tool may comprise a boring bar. A method and an apparatus using a measuring tool and an integrated tool and nozzle may provide a number of advantages. In some embodiments, cutting and measuring are separate steps performed sequentially; in other embodiments, measurement is simultaneous with removal of material from the tool.

According to other aspects of this disclosure, a method is provided for using an apparatus as heretofore described to take a measurement reading and determine a measurement parameter. A measuring operation may comprise taking a single reading or taking multiple readings. When multiple readings are taken in a single measuring operation, the computer may employ an algorithm to determine the measurement parameter based on the multiple readings.

Further features of certain embodiments are described hereinbelow. The scope of the appended claims should not be deemed limited by the above summary or the following description, but rather is defined by the appended claims as construed in accordance with applicable law.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 4 a perspective view, enlarged with respect to FIG. 3 illustrating the machining spindle and the horizontally and vertically disposed rails via which the spindle may be translated;

FIG. 18 is a side elevation view of one embodiment of an integrated cutting tool and fluid dispensing nozzle, the cutting tool taking the form of a boring bar with a boring bar insert;

FIG. 19 is a front elevation of the boring bar illustrated in FIG. 18 when employed in a cutting operation;

FIG. 20 is a cross sectional view taken along line 20-20 in FIG. 18 and further depicting a workpiece, the boring bar being shown in a measurement position;

FIG. 21 is a side elevation view of an alternative embodiment of an integrated cutting tool and nozzle, the tool again taking the form of a boring bar with a boring bar insert;

FIG. 22 is a cross sectional view taken along line 22-22 in FIG. 21 and further illustrating a workpiece, the boring bar being shown in a position to allow for a simultaneous cutting and measurement of the workpiece;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Any suitable apparatus may be employed in conjunction with the methods disclosed herein. In some embodiments, the methods are performed using a computer numerically controlled machine, illustrated generally in FIGS. 1-9. A computer numerically controlled machine is itself provided in other embodiments. The machine 100 illustrated in FIGS. 1-9 is an NT-series machine, versions of which are available from Mori Seiki USA, Inc., the assignee of the present application. Other suitable computer numerically controlled machines include the NL-series machines with turret (not shown), also available from Mori Seiki USA, Inc. Other machines may be used, including the NZ, NH, NV, and NMV machines, also available from Mori Seiki USA, Inc.

Figure 1:
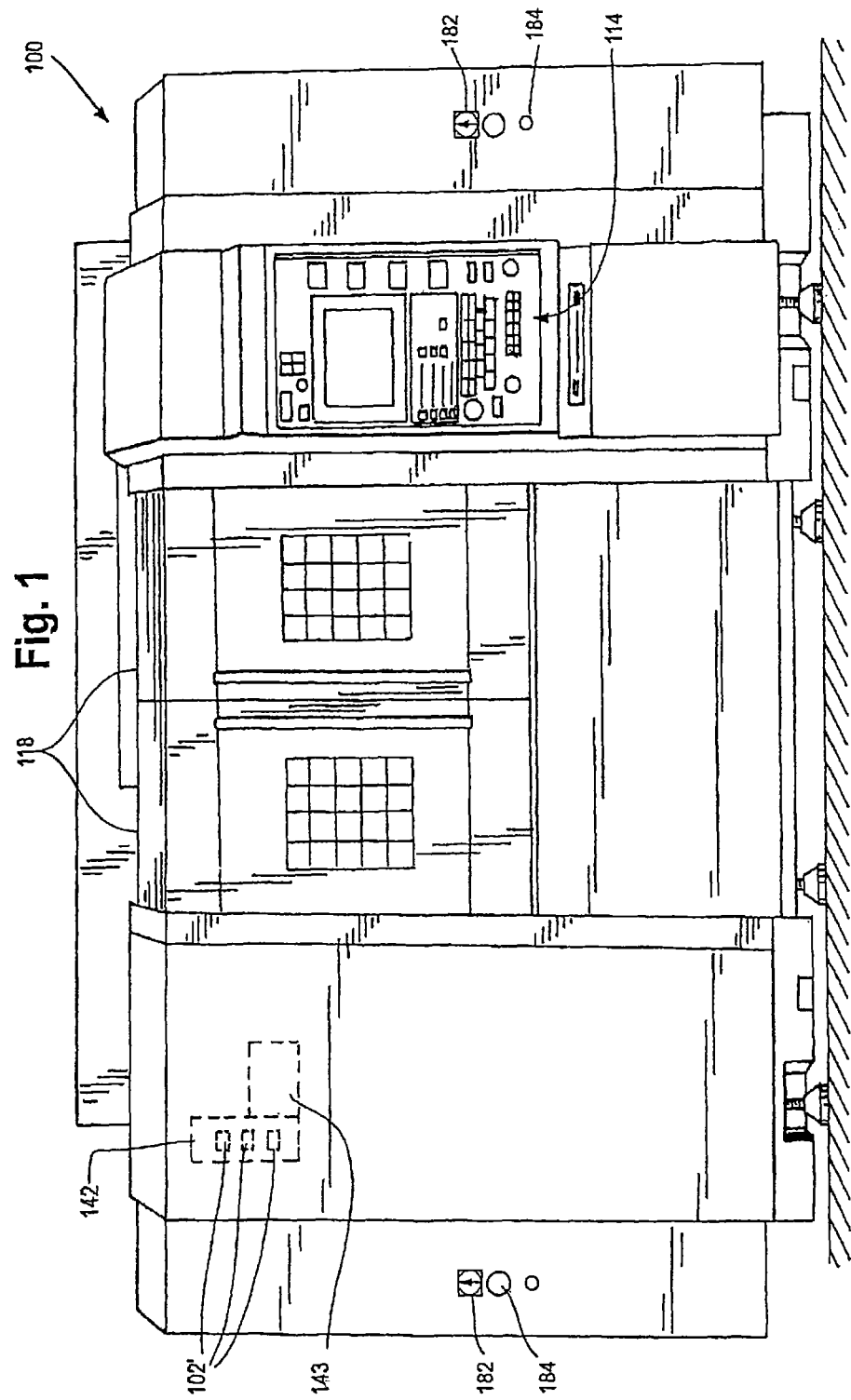
FIG. 1 is a front elevation of a computer numerically controlled machine in accordance with one embodiment of the present disclosure, shown with safety doors closed.
Figure 2:
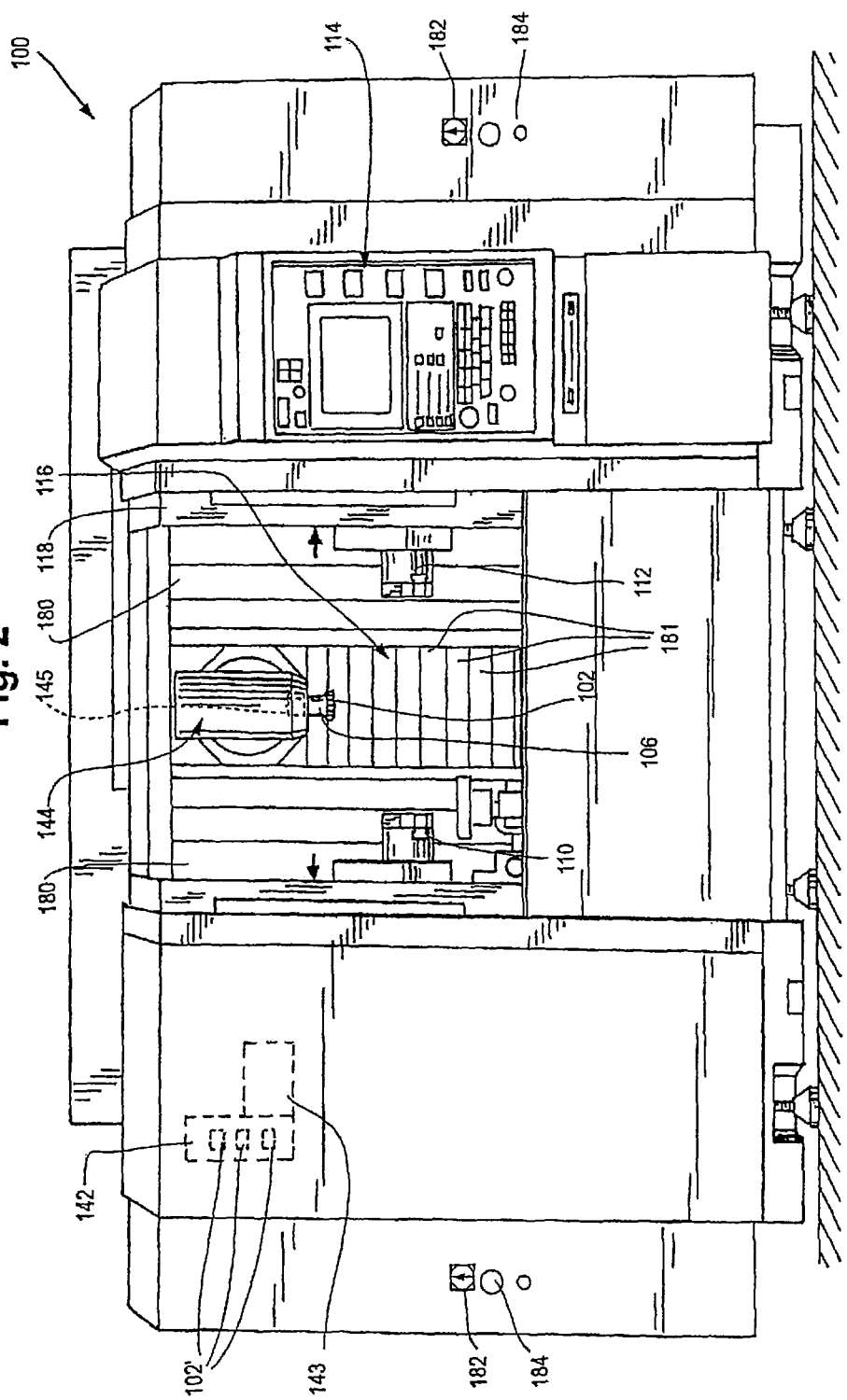
FIG. 2 is a front elevation of a computer numerically controlled machine illustrated in FIG. 1, shown with the safety doors open.
Figure 3:
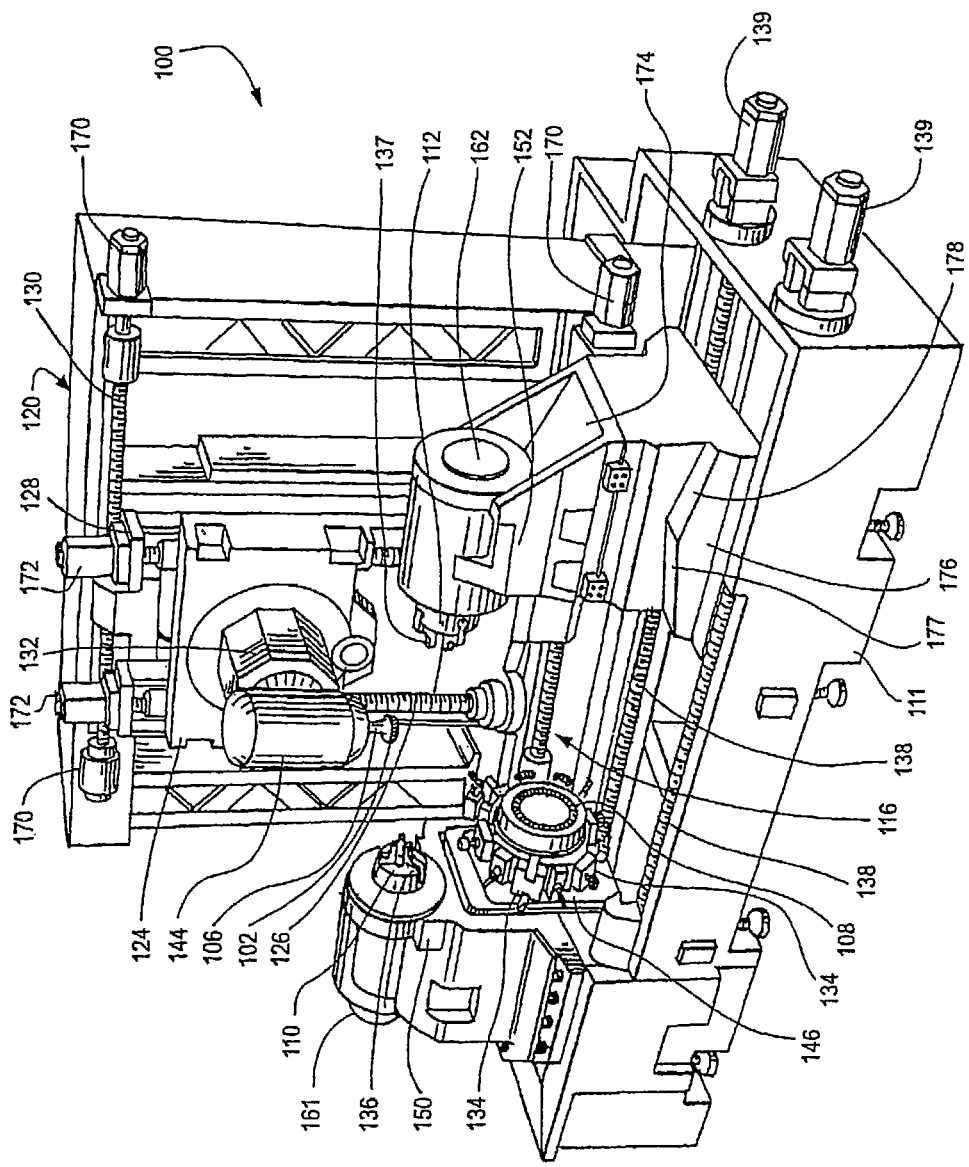
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first retainer and a second retainer, each of which may be one of a spindle retainer associated with spindle 144, a turret retainer associated with a turret 108, or a chuck 110, 112. In the embodiment illustrated in the Figures, the computer numerically controlled machine 100 is provided with a spindle 144, a turret 108, a first chuck 110, and a second chuck 112. The computer numerically controlled machine 100 also has a computer control system operatively coupled to the first retainer and to the second retainer for controlling the retainers, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the chamber 116 to prevent injury to the user or interference in the operation of the computer numerically controlled machine 100. The safety doors 118 can be opened to permit access to the chamber 116 as illustrated in FIG. 2. The computer numerically controlled machine 100 is described herein with respect to three orthogonally oriented linear axes (X, Y, and Z), depicted in FIG. 4 and described in greater detail below. Rotational axes about the X, Y and Z axes are connoted "A," "B," and "C" rotational axes respectively.

The computer numerically controlled machine 100 is provided with a computer control system for controlling the various instrumentalities within the computer numerically controlled machine. In the illustrated embodiment, the machine is provided with two interlinked computer systems, a first computer system comprising a user interface system (shown generally at 114 in FIG. 1) and a second computer system (not illustrated) operatively connected to the first computer system. The second computer system directly controls the operations of the spindle, the turret, and the other instrumentalities of the machine, while the user interface system 114 allows an operator to control the second computer system. Collectively, the machine control system and the user interface system, together with the various mechanisms for control of operations in the machine, may be considered a single computer control system. In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically computer controlled machine 100 may have a tool magazine 142 and a tool changing device 143. These cooperate with the spindle 144 to permit the spindle to operate with plural cutting tools (shown in FIG. 1 as tools 102'). Generally, a variety of cutting tools may be provided; in some embodiments, plural tools of the same type may be provided.

The spindle 144 is mounted on a carriage assembly 120 that allows for translational movement along the X- and Z-axes, and on a ram 132 that allows the spindle 144 to be moved in the Y-axis. The ram 132 is equipped with a motor to allow rotation of the spindle in the B-axis, as set forth in more detail hereinbelow. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the cutting tool 102 by way of a spindle connection and a tool holder 106. The spindle connection 145 (shown in FIG. 2) is connected to the spindle 144 and is contained within the spindle 144. The tool holder 106 is connected to the spindle connection 145 and holds the cutting tool 102. Various types of spindle connections are known in the art and can be used with the computer numerically controlled machine 100. Typically, the spindle connection 145 is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 110. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
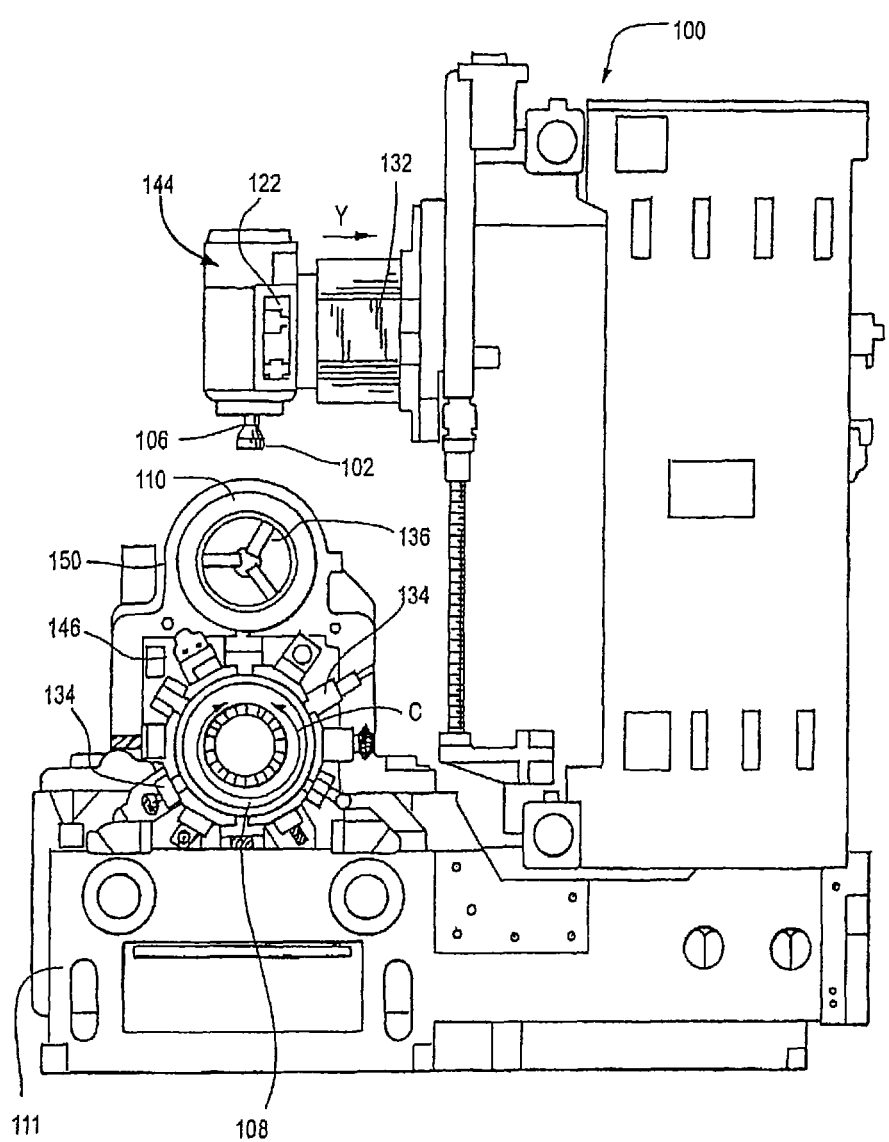
FIG. 5 is a side view of the first chuck, machining spindle, and turret of the machining center illustrated in FIG. 1.
Figure 6:
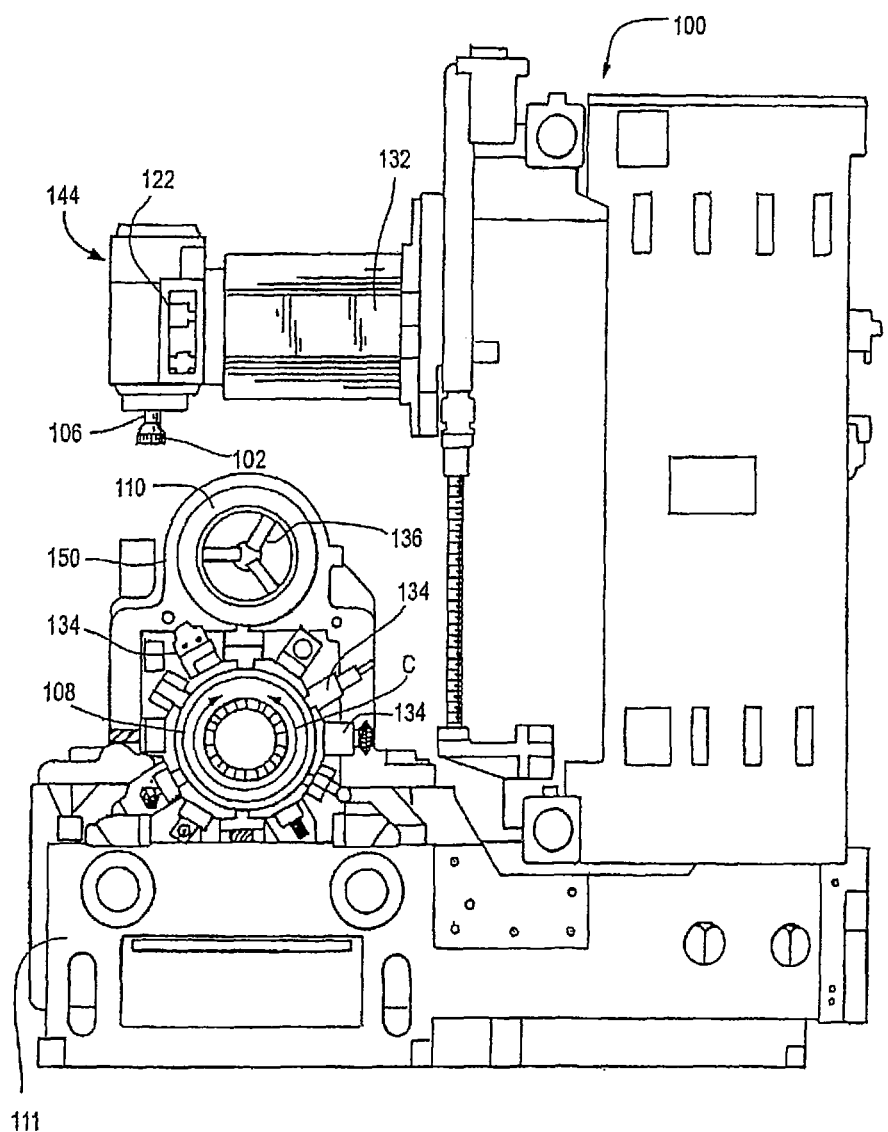
FIG. 6 is a view similar to FIG. 5 but in which a machining spindle has been translated in the Y-axis.
Figure 9:
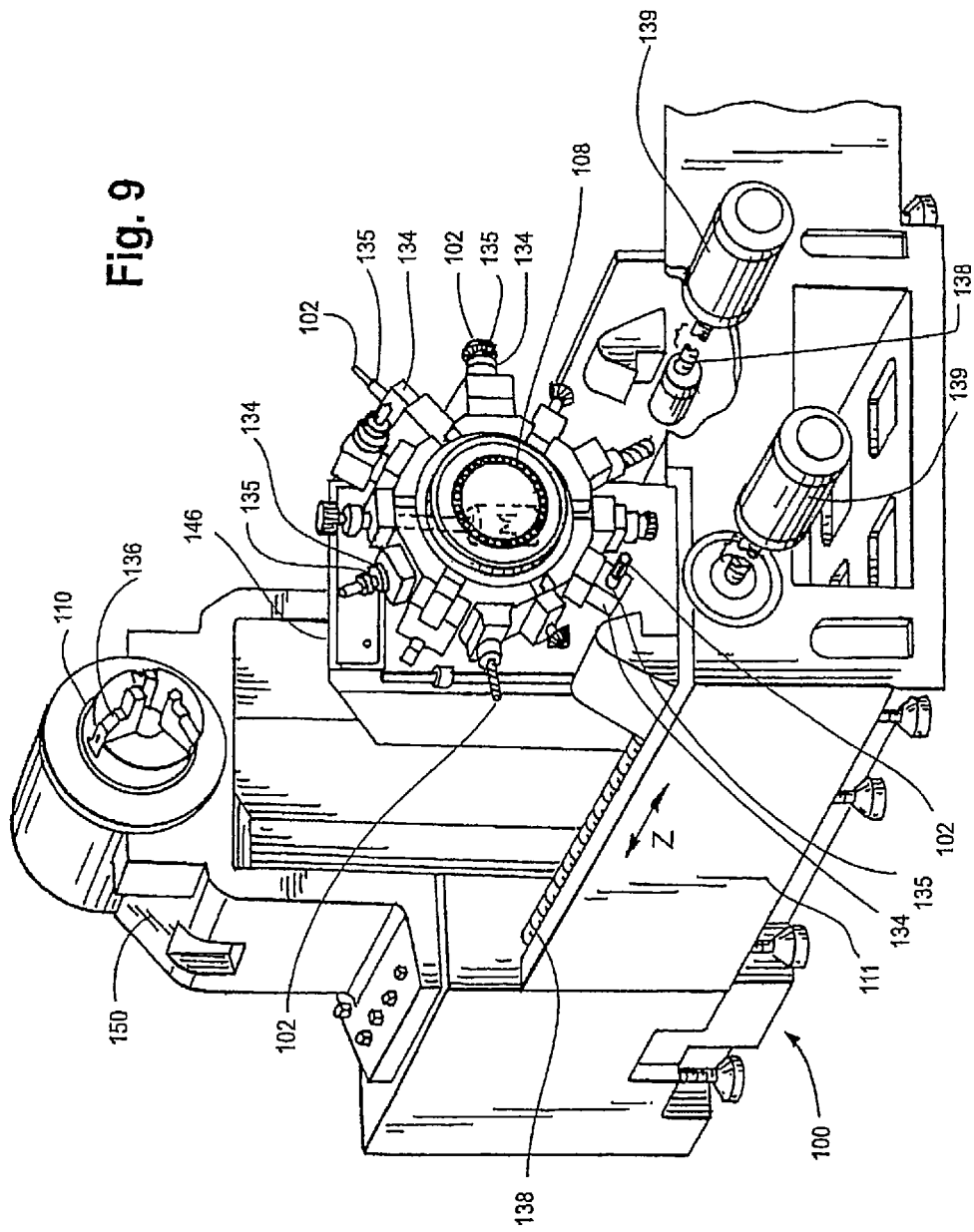
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 (FIG. 5) that also engages rails 138 and that may be translated in a Z-direction, again via ball-screw devices. The turret 108 is provided with various turret connectors 134, as illustrated in FIG. 9. Each turret connector 134 can be connected to a tool holder 135 or other connection for connecting to a cutting tool. Since the turret 108 can have a variety of turret connectors 134 and tool holders 135, a variety of different cutting tools can be held and operated by the turret 108. The turret 108 may be rotated in a C' axis to present different ones of the tool holders (and hence, in many embodiments, different tools) to a workpiece.

Figure 7:
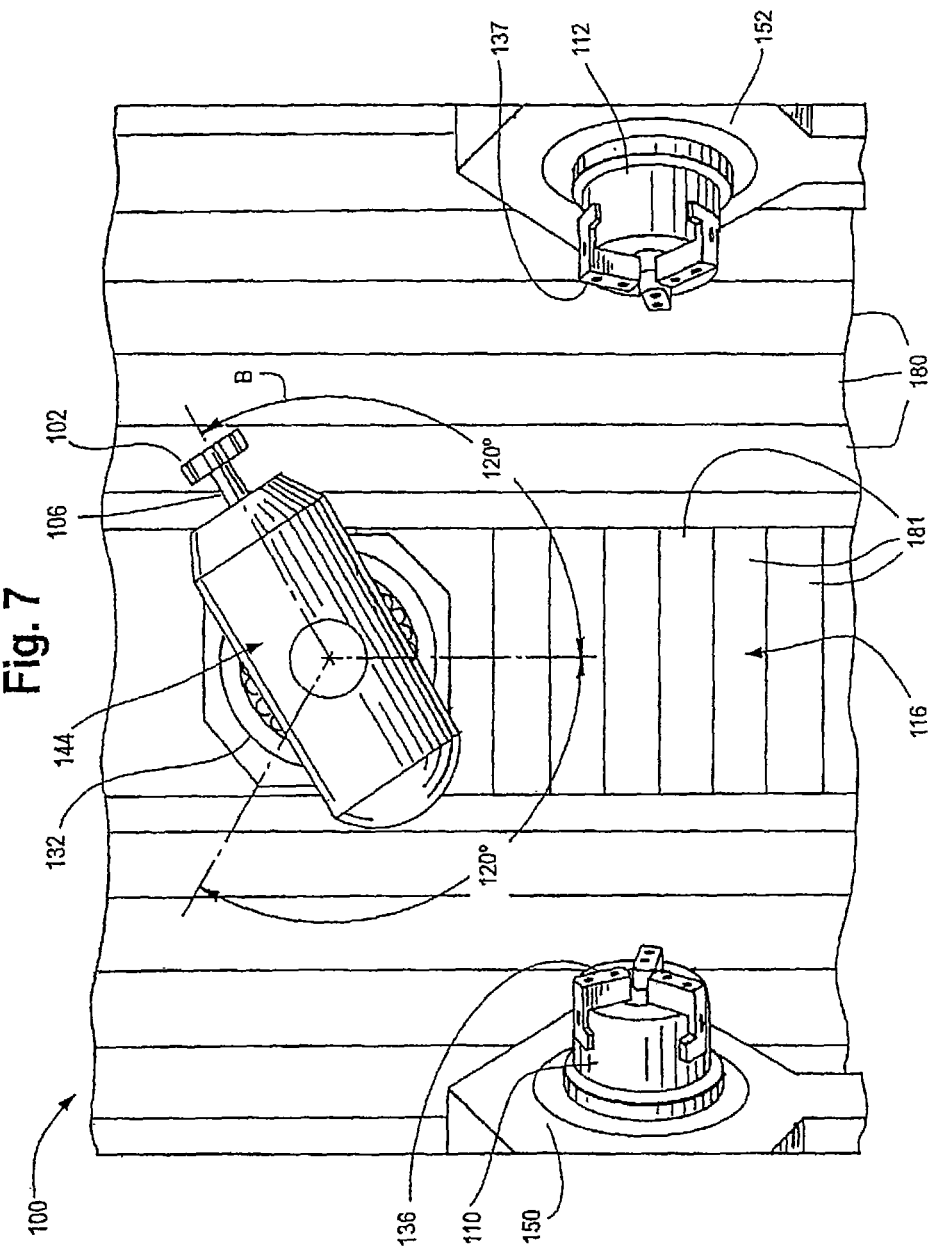
FIG. 7 is a front view of the spindle, first chuck, and second chuck of the computer numerically controlled machine illustrated in FIG. 1, including a line depicting the permitted path of rotational movement of this spindle.
Figure 8:
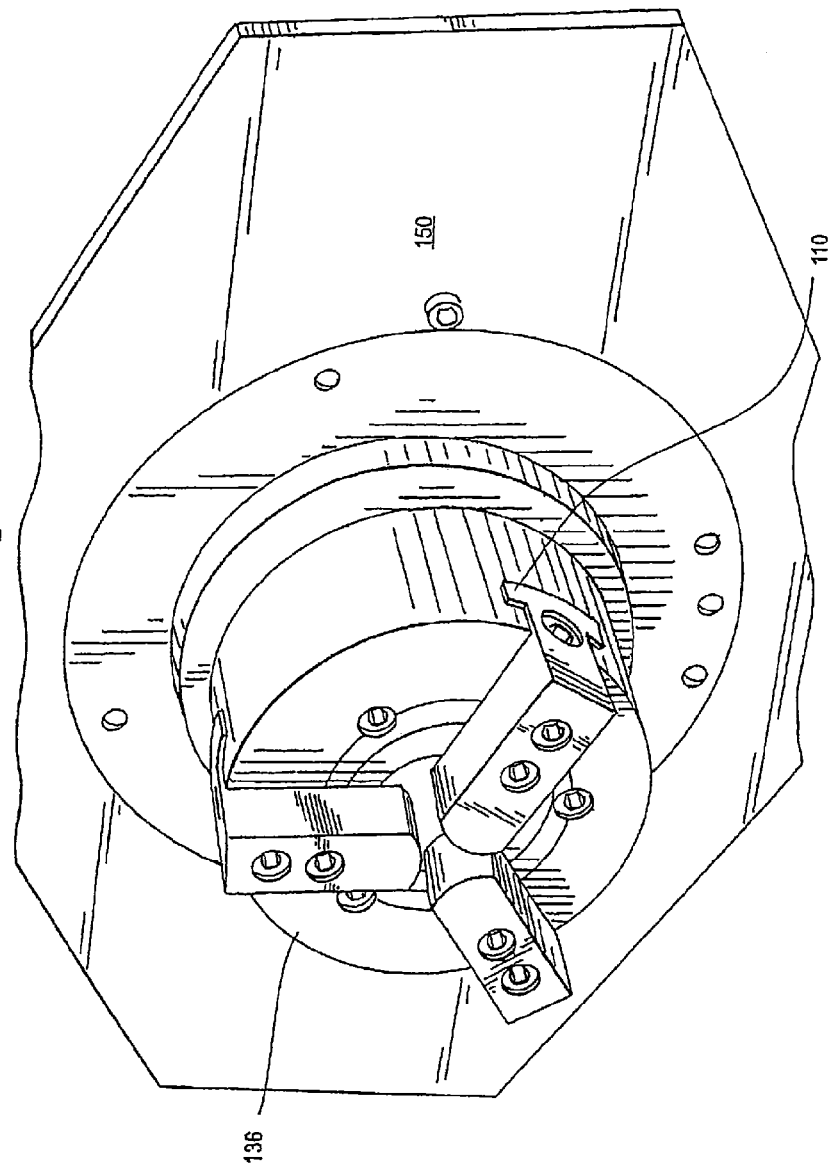
FIG. 8 is a perspective view of the second chuck illustrated in FIG. 3, enlarged with respect to FIG. 3.

It is thus seen that a wide range of versatile operations may be performed. With reference to tool 102 held in tool holder 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changing device 143. With reference to FIGS. 4 and 5, the spindle 144 may be translated in the X and Z directions (shown in FIG. 4) and Y direction (shown in FIGS. 5 and 6). Rotation in the B axis is depicted in FIG. 7, the illustrated embodiment permitting rotation within a range of 120° to either side of the vertical. Movement in the Y direction and rotation in the B axis are powered by motors (not shown) that are located behind the carriage 124. Generally, as seen in FIGS. 2 and 7, the machine is provided with a plurality of vertically disposed leaves 180 and horizontal disposed leaves 181 to define a wall of the chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the chamber 116.

In the illustrated embodiment, the computer numerically controlled machine 100 is provided with numerous retainers. Chuck 110 in combination with jaws 136 forms a retainer, as does chuck 112 in combination with jaws 137. In many instances these retainers will also be used to hold a workpiece. For instance, the chucks and associated stocks will function in a lathe-like manner as the headstock and optional tailstock for a rotating workpiece. Spindle 144 and spindle connection 145 form another retainer. Similarly, the turret 108, when equipped with plural turret connectors 134, provides a plurality of retainers (shown in FIG. 9).

The computer numerically controlled machine 100 may use any of a number of different types of cutting tools known in the art or otherwise found to be suitable. For instance, the cutting tool 102 may be a milling tool, a drilling tool, a grinding tool, a blade tool, a broaching tool, a turning tool, or any other type of cutting tool deemed appropriate in connection with a computer numerically controlled machine 100. As discussed above, the computer numerically controlled machine 100 may be provided with more than one type of cutting tool, and via the mechanisms of the tool changing device 143 and magazine 142, the spindle 144 may be caused to exchange one tool for another. Similarly, the turret 108 may be provided with one or more cutting tools 102, and the operator may switch between cutting tools 102 by causing rotation of the turret 108 to bring a new turret connector 134 into the appropriate position.

Other features of a computer numerically controlled machine include, for instance, an air blower for clearance and removal of chips, various cameras, tool calibrating devices, probes, probe receivers, and lighting features. The computer numerically controlled machine illustrated in FIGS. 1-9 is not the only machine capable of performing the methods disclosed herein, but to the contrary, other embodiments are envisioned.

The computer numerically controlled machine in accordance with some embodiments of this disclosure is provided with a measuring device. The exemplary device 200 illustrated in FIG. 10 includes a source 201 of a substantially incompressible fluid that may be fluidically coupled to a nozzle 202. In some embodiments, it is contemplated that the source 201 of fluid may be the source of cooling fluid of the computer numerically controlled machine, and that the same fluid used as cooling fluid is used in connection with the measurements obtained as described herein. In other embodiments, a different source of fluid (not shown) may be employed. As illustrated, the source 201 of fluid is fluidically communicable with the nozzle 202 via a fluid line 203. A valve, such as a computer-controlled valve or a manually actuated valve (not shown), may be optionally employed to allow or disallow fluidic communication between the source 201 and nozzle 202. Coupled to the line 203 is a pressure transducer 206, which, in accordance with known methods, responds to pressure in the line 203 and sends electronic information via communication path 208 to a computer 210.

Generally, the measuring device may be incorporated into a computer numerically controlled machine in a suitable matter. It is further contemplated that the measuring device, in some embodiments, is not incorporated with a computer numerically controlled machine. When incorporated with a computer numerically controlled machine, the nozzle may be employed on any suitable holder or retainer in the machine, such as on a turret connector 134, the machine spindle 144, or one of the chucks 110, 112. It is contemplated that the cutting tool may be disposed on another holder in the machine, and it is also completed that a workpiece may be disposed in yet another holder of the machine. Enumerating the holder that contains a workpiece as a first holder, the holder that contains the tool as a second holder, and the holder that retains the nozzle as a third holder, it is contemplated that the first holder should be moveable relative to the second holder and that the third holder likewise should be movable with respect to the second holder. It is contemplated that in some embodiments the first and third holder will be movable relative to one another. In other embodiments, it is contemplated that the first and third holder are stationary and not movable with respect to one another (e.g., if the tool and nozzle are carried together in a carriage (not shown)). Additionally, as discussed hereafter, it is contemplated that the tool and nozzle may be integrated, and, in such embodiments, the tool and nozzle may be carried in the same holder. In such embodiments, the holder that contains the tool and the nozzle should be movable relative to the holder that contains the workpiece.

Figure 10:
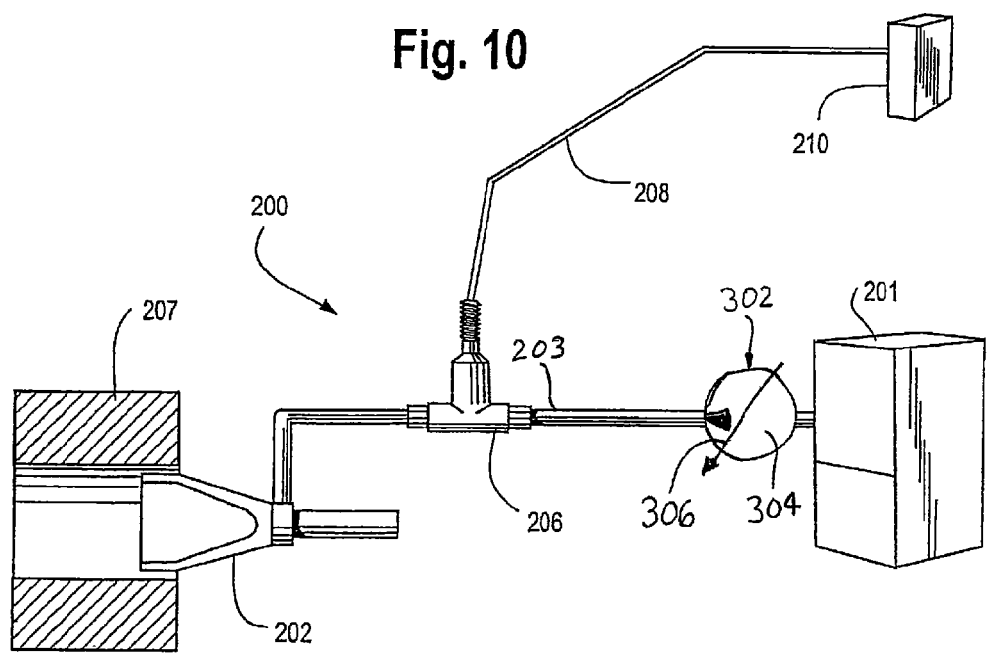
FIG. 10 is a schematic representation of a measuring device in accordance with one embodiment of the disclosure.

The transducer 206 may be any device now known in the art or otherwise found to be suitable for sending electrical signals relating to pressure. The transducer 206 may measure pressure in the line 203 or in an after chamber (not shown) or in any other location suitable to allow for a pressure-based measurement reading to be taken. The communication path 208 between the transducer 206 and the computing device 210 is shown in FIG. 10 as a wired communication path, but any other suitable form of communication (such as wireless or networked communication) may be employed. As illustrated, the computer 210 is a microcontroller coupled to the CNC computer control system (the user interface 114 of which has been described previously and which may employ MAPPS control system by Mori Seiki USA). The controller 210 is equipped with a suitable I/O card (not shown) for receipt of electronic signals from the pressure transducer. It is contemplated, however, that a computer could be a separate computer, and, some embodiments, a computer that is remote from the CNC machine.

The fluid source 201 is equipped with a pump 302 that is configured to provide a constant volumetric flow rate to the nozzle during the course of taking a measurement reading. The pump 302 may have a pump chamber 304 with at least a first displacement setting having a first fixed volume. Operation of the pump in the first displacement setting at a first speed will generate a first fluid flow having a substantially constant first volumetric flow rate. With the pump chamber 304 remaining in the first displacement setting, the pump 302 may be operated at a second speed to generate a second, different fluid flow having a substantially constant second volumetric flow rate. Alternatively, the pump chamber 304 may have a second displacement setting having a second fixed volume, so that operation of the pump 302 in the second displacement setting and at the first speed will generate a second fluid flow having a substantially constant second volumetric flow rate. The pump chamber 304 may further have three or more displacement settings. A swash plate 306 may be operatively coupled to the pump chamber 304 to permit stroke and plate angle, thereby to selectively adjust the pump chamber volume. As hereinafter discussed, the swash pump also may be configured to permit adjustments to the volumetric flow rate over the course of multiple readings. In some embodiments, different constant volumetric flow rates may be used when measuring different features of an item.

It is contemplated, in some embodiments, that the flow rate may be estimated based on an estimated dimension of the item to be measured. Generally, for a larger item with a larger estimated measurement parameter, it will be desired to employ a larger volumetric flow rate than for a smaller item. It is contemplated that the flow rate may be varied either manually or automatically using the control systems of the machine. In some embodiments, the flow rate is adjusted by adjusting the rate of revolution of a pump. In other embodiments, where a swash pump is employed, the volumetric flow rate is adjusted by adjusting the swash mechanism to vary the displacement per revolution of the pump.

The nozzle 202 may be included within the computer-numerically controlled machine at any suitable location. For instance, in the machine illustrated in FIGS. 1-9, the nozzle 202 may be disposed on the turret 108, on one of the first chuck 10 or second chuck 112, or elsewhere within the machine. Similarly, the nozzle 202 may be retained when not in use in the tool magazine 142 and may be placed into position via the tool changing device 143.

The nozzle 202 and associated plug may take any appropriate form. In some embodiments, it is contemplated that the nozzle may rotate during the course of taking of measurement reading. In other embodiments, it is contemplated that the nozzle 202 does not rotate during the course of taking a measurement reading, i.e., that the nozzle 202 is a non-rotational nozzle. The exact configuration of the nozzle 202 and the rotation or non-rotation of the nozzle 202 during the course of taking a measurement reading will, in a particular situation, be selected in a manner consistent with the requirements at hand.

In operation, when it is desired to take a measurement reading, the pump is operated and fluid is conveyed to the nozzle 202 at a base pressure. Any suitable base pressure may be employed, but it has been found useful to employ a base pressure of about 300 psi or greater, in some embodiments 400 psi or greater, and in some embodiments 500 psi or greater. Generally, it is desired to conduct measurement at a pressure that is as high as possible given the limits of the machine, with appropriate safety tolerances. If, for instance, the maximum safe operating pressure is 1000 psi and a pressure increase of 500 psi is expected, the operator may select a base pressure of 300 or 400 psi to come close to the maximum safe operating pressure without exceeding it. Conveyance of a liquid at these pressures is believed to assist in removing swarf from the measurement site on the item being measured and in permitting the nozzle 202 to operate at a distance from the item being measured (in FIG. 10, the part 207) that permits easy operation. The nozzle 202 is brought into proximity with the item to be measured, thus causing the pressure in the line 203 to increase. An electronic signal is conveyed to the computer 210 by the transducer 206, and, via the electronic signal, the computer 210 is configured to determine a measurement parameter. Generally, as is known in the art of pneumatic measurement, the pressure measured by the transducer 206 will increase with a decrease in the distance between the tip of the nozzle 202 and the surface of the item being measured. The fluid flow may begin before or after the nozzle 202 is brought into proximity with the item being measured.

The distance between the orifice and the item being measured may be any value suitable to allow for a pressure-based measurement reading. In some embodiments, it has been found that the distance between the orifice and the item being measured may be larger than that employed in air gauging. Typical prior air gauge plugs require a small gap (on the order of two-thousandths of an inch). In connection with measurement of finely featured items, such as gears and threaded surfaces, prior art air gauge plugs generally cannot be employed, or can be employed only with difficulty. In contrast, in some embodiments, the gap between the orifice and the item being measured may be larger. In some embodiments, it is possible to employ a gap in the order of five thousandths of an inch. This allows for use of a gage that meshes with a threaded item or with a gear. Generally, it is contemplated that the average dimension of the thread or gear may be measured, allowing the operator to accept or reject the item as appropriate.

During the course of a measuring operation, multiple measurement readings may be taken. In such event, the computer may be configured to determine a measurement parameter algorithmically based on the multiple readings. The algorithm may be applied to the data set generated by the pressure transducer 206 before determining a measurement parameter, or may be applied to the data set of measurement parameters determined after calculation of plural measurement parameters based on plural readings. For instance, the algorithm may be as simple as determining the mean average of the measurement parameters obtained over the course of multiple readings. In another algorithm, plural measurement readings are taken, and the high and low measurement readings (or the high and low data readings from the pressure transducer) are discarded, and the mean average of the remaining values is determined. Numerous other, more complex algorithms may be employed.

When a swash pump is employed, the pump may be operated in various ways consistent with the foregoing. For instance, in taking plural readings, a constant volumetric flow rate may be applied in each case, and the settings of the swash pump (volume per revolution), may be kept constant. Alternatively, during the course of a measuring operation, plural readings may be taken using a constant volumetric flow rate but by varying the swash pump parameters. Again, when measuring different features of an item, different volumetric flow rates may be employed. In some embodiments, it is contemplated that the constant volumetric flow rate may be varied from one reading to another over the course of plural readings taken during a single measuring operation. In any case, the volumetric flow rate should be kept constant during the course of a measurement reading; the term "constant" signifying constant within the limits of the machine or within a surrounding predetermined range of tolerance.

Figure 11:
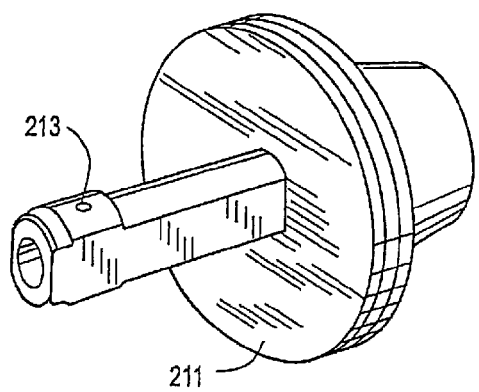
FIG. 11 is a perspective view of a nozzle useful in measuring the inside diameter of a tubular form.
Figure 12:
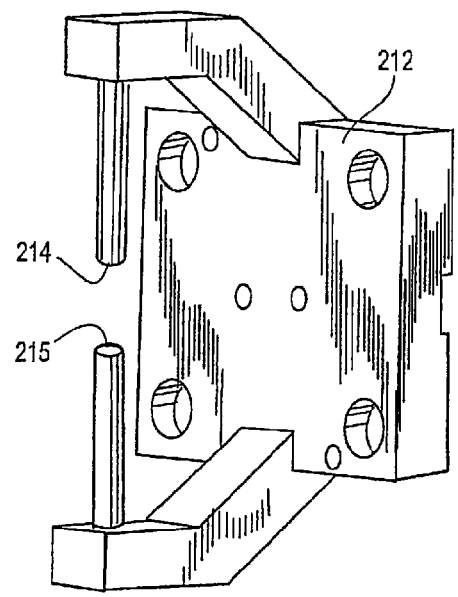
FIG. 12 is a perspective view of a nozzle useful in measuring the outside diameter of a tubular form.

The measuring device may be provided with a single nozzle or with plural nozzles, and in either case, may be provided with nozzles of general application or nozzles designed specifically for measurement of a form of predetermined configuration. The nozzle 211 illustrated in FIG. 11 is contemplated to be useful in measuring the tubular forms, or forms that include a partial or complete bore. Again, as described hereinabove, the measurement parameter may include, for instance, the inside diameter of the tubular form or bore, the regularity of the bore, or the position of the center of the bore. Nozzle 211 contains two opposing orifices (one shown at 213). In some cases it is contemplated that multiple readings along the radial circumference or other portion of the surface of the item being measured may be taken. For instance, in determining the regularity of a bore or the center position of the bore, the nozzle and the form may be caused to rotate relative to one another, by rotation of the nozzle relative to the base of the machine, by rotation of the form relative to the base of the machine, or both, over the course of multiple measuring operations. Similarly, when it is desired to measure a form with a cylindrical shape or projection, the nozzle 212 illustrated in FIG. 12 may be employed. This nozzle includes two orifices 214, 215. Again, it is contemplated that the measurement may be a diameter measurement or multiple measurements over the exterior surface of the form.

Figure 13:
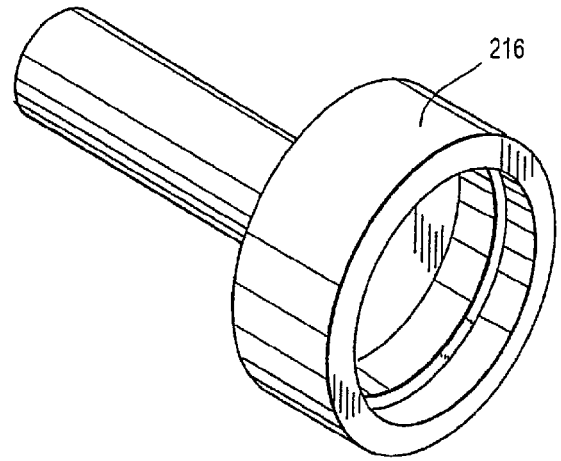
FIG. 13 is a perspective view of a calibration device useful in calibrating the measuring device when used with the nozzle shown in FIG. 11.
Figure 14:
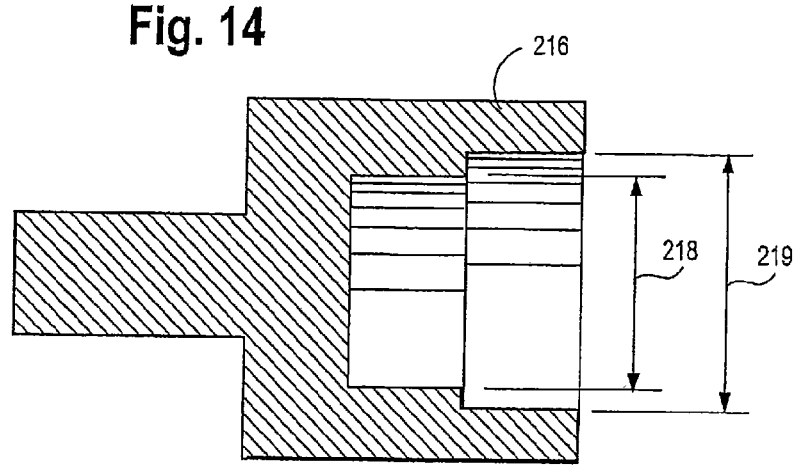
FIG. 14 is a side elevation view, partially cut away, showing different internal diameters of the calibration device shown in FIG. 13.
Figure 15:
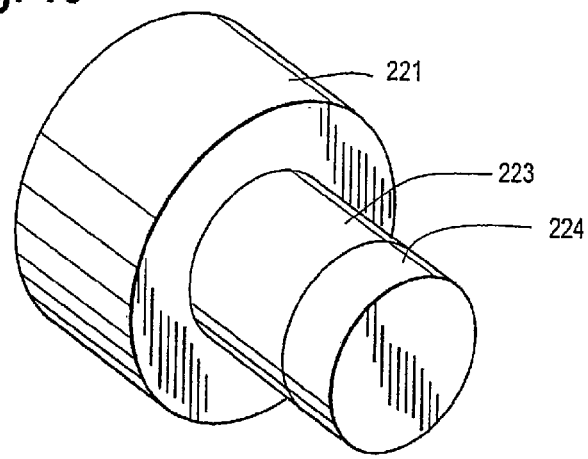
FIG. 15 is a perspective view of a calibration device useful in calibrating the measuring device when used with the nozzle shown in FIG. 12.

The exact relationship of a particular pressure reading to a particular dimension cannot be stated as a general matter, because this relationship will depend on a number of factors, including the pressure employed in the line 203, the configuration of the pressure transducer 206, and other factors. Generally, the measuring device 200 should be calibrated. To assist in calibrating the measuring device 200, and, after initial calibration, to assist in periodic calibrating adjustment of the device 200 one or more calibration devices may be provided. As shown in FIG. 13, for instance, the calibration device 216 may comprise a generally tubular form 217 having plural interior diameters 218, 219, as best shown in FIG. 14. The illustrated device consists of a form having two interior diameters, but a greater number of interior diameters may be provided if desired. For use with the nozzle 212 illustrated in FIG. 12, the calibration device 221 illustrated in FIG. 15 may be employed. This device has a tiered cylindrical form with plural projections 223, 224 of different diameters. Again, the illustrated device is provided with two projections of varying diameter, but additional projections may be provided if desired. Alternatively, or in addition thereto, plural calibration devices may be employed. In any case, the calibration devices, which are provided with known exterior or interior diameters or other dimensions may be employed as needed within the CNC machine.

Figure 16:
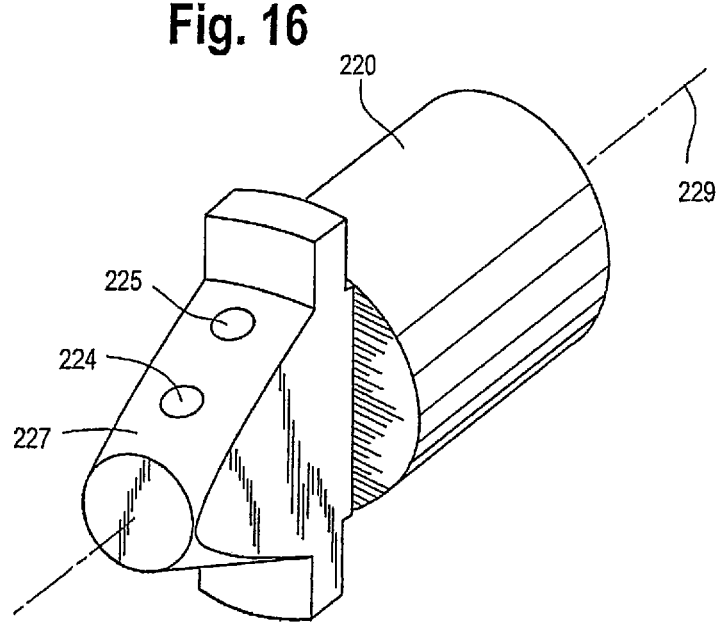
FIG. 16 is a schematic perspective view of a tapered nozzle useful in conjunction with the measuring device disclosed herein.
Figure 17:
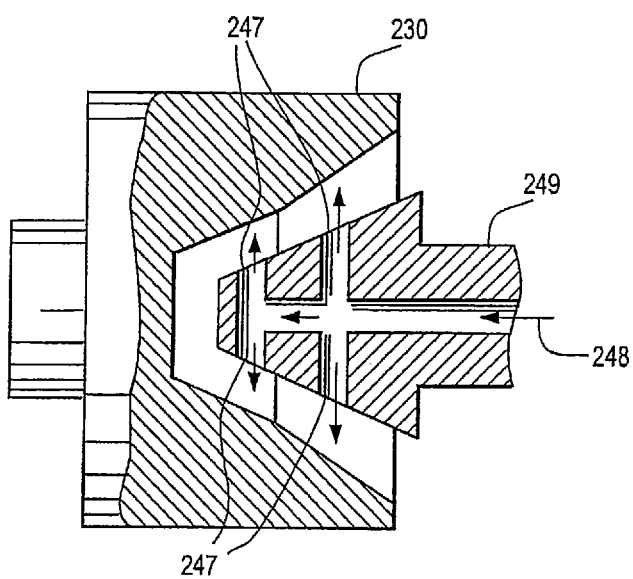
FIG. 17 is a side view, partially cut away, of the nozzle shown in FIG. 16, positioned to take a measurement reading of a part.

As shown in FIG. 16, the nozzle 220 may have any other suitable form and, as illustrated, may be provided with plural orifices 224, 225 disposed on a surface 227 that is at an oblique angle with respect to the mounting axis 229 of the nozzle 220. In this embodiment, the measuring device may be provided with plural lines or a switching mechanism (not shown) to enable fluid selectively to be discharged from each orifice independently. Alternatively, as shown in FIG. 17, a single gage 249 may include multiple orifices 247 that deliver fluid simultaneously and that are connected to a single fluid line 248. This form of gage will measure the average dimension of multiple features, and it is seen that at least two (and in other embodiments, more than two) orifices are positioned to measure separately sized features. Thus, for instance, as illustrated in FIG. 17, when it is desired to measure a form 230 having the indicated geometry, the nozzle 249 may be moved into position and multiple measuring operations may be conducted on different portions of the form 230 without the need to move the nozzle 249.

Figure 17A:
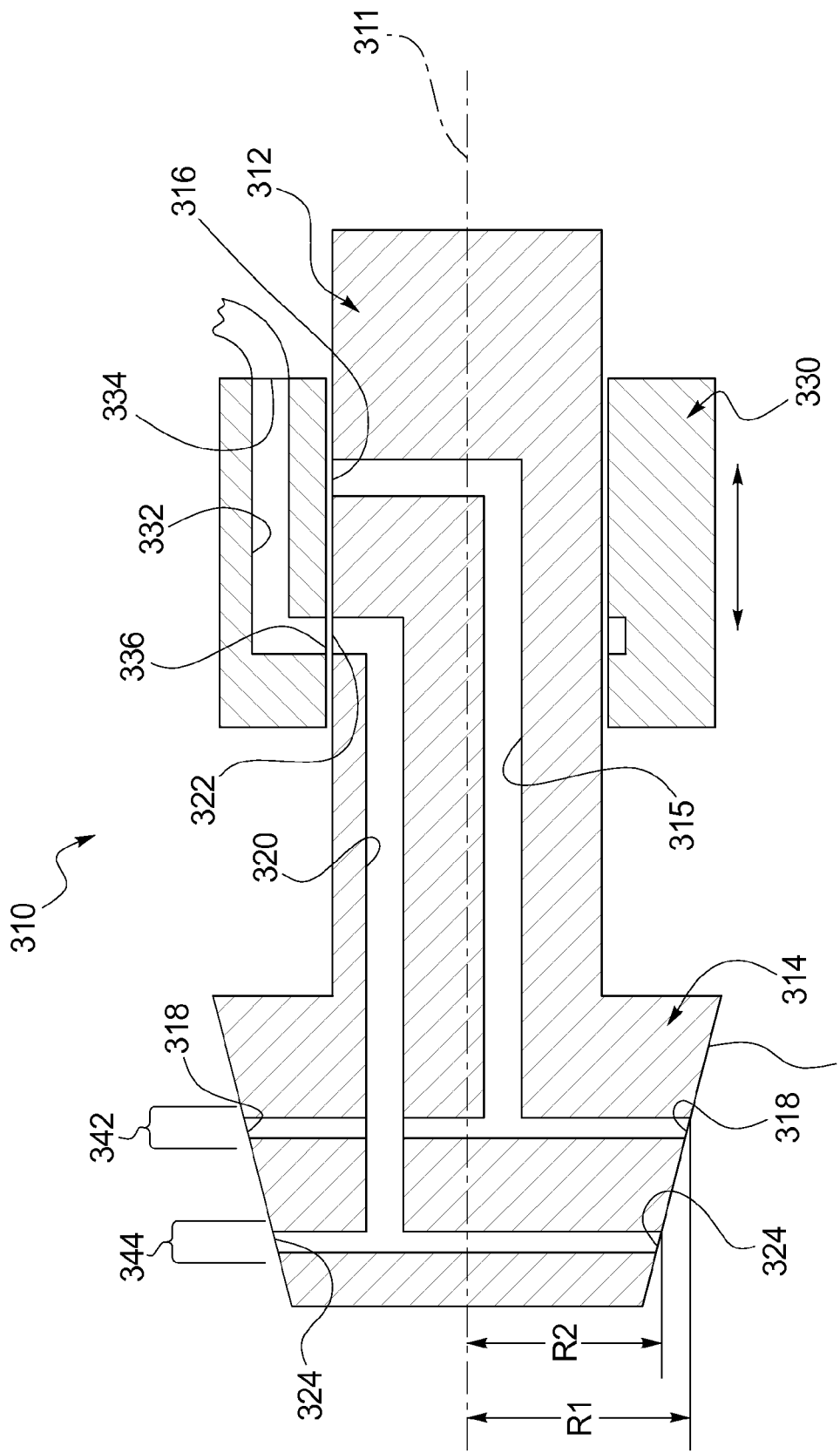
FIG. 17A is a side view, in cross-section, of an alternative nozzle embodiment.

As illustrated in FIG. 17A, a nozzle 310 may be configured to measure multiple features with a single placement of the nozzle 310. The nozzle 310 generally extends along a longitudinal axis 311 and includes a body 312 and a head 314. A first nozzle conduit 315 is formed in the nozzle 310 and includes a first nozzle inlet 316 and a set of first nozzle orifices 318. A second nozzle conduit 320 is formed in the nozzle and includes a second nozzle inlet 322 and a set of second nozzle orifices 324. While FIG. 17A illustrates two first nozzle orifices and two second nozzle orifices, it will be appreciated that one orifice or more than two orifices may be associated with each nozzle conduit. An adapter 330 may be slidably coupled to the nozzle body 312 and defines an adapter conduit 332. The adapter conduit 332 includes an adapter inlet 334 fluidly communicating with the source and an adapter outlet 336. The adapter 330 is slidably received on the nozzle body 312 to permit movement of the adapter 330 along the longitudinal axis 311 between a first position, in which the adapter outlet 336 fluidly communicates with the first nozzle inlet 316, and a second position, in which the adapter outlet 336 fluidly communicates with the second nozzle inlet 322 (which is the position shown in FIG. 17A). While the illustrated embodiment shows the adapter 330 making a translational movement between the first and second positions, it will be appreciated that other types of slidable movement, including rotational movement, may also be used. Accordingly, the term "slidable" as used in the present specification and claims is intended to broadly encompass any type of relative movement between the adapter 330 and the nozzle 310 that permits the adapter outlet 336 to selectively communicate with the first and second nozzle inlets 316, 322. The first and second nozzle conduits 315, 320 are separate and do not directly communicate with one another, so that fluid is only delivered to a selected one of the first and second sets of nozzle orifices 318, 324, but not both.

The nozzle 310 of FIG. 17A may be used to measure multiple, differently sized features with a single placement of the nozzle 310 relative to the workpiece. According to the illustrated embodiment, the nozzle head 314 has a tapered outer surface 340. The set of first nozzle orifices 318 is located in a first section 342 of the head 314 disposed at a first radial distance R1 from the longitudinal axis 311, while the set of second nozzle orifices 324 is located in a second section 344 of the head 314 disposed at a second radial distance R2. Accordingly, the first and second sections 342, 344 may be positioned proximate associated portions of the workpiece with a single placement of the nozzle body 312. Those portions of the workpiece may then be sequentially measured by placing the adapter 330 in the first position, monitoring a parameter of the fluid to obtain information regarding the workpiece first portion, moving the adapter 330 to the second position, and monitoring a parameter of the fluid to obtain information regarding the workpiece second portion.

The measuring device may be used to provide feedback to the operator (or to the computer control system) of the CNC machine. For instance, after providing a workpiece and removing material from the workpiece, a measuring operation may be conducted. If sufficient material has been removed from the workpiece and a workpiece has a dimension within a suitable range of tolerance, the workpiece may be removed from the machine and, if desired, a new workpiece introduced. On the other hand, if sufficient material has not been removed from the workpiece, the measuring device may be disengaged and more material removed from the workpiece as appropriate.

As heretofore discussed, in some embodiments, a tool may be integrated with a nozzle, as shown, for instance, in FIGS. 18-20. With respect to FIG. 18, the tool 250, which, in the illustrated embodiment, is a boring bar, includes a boring bar insert 251 and a nozzle 252 which fluidically communicates with a source of fluid (not shown) via a fluid path 254. In practice, the boring bar may be used conventionally in a creation of a bore within a workpiece 256, as shown in FIG. 19. When it is desired to measure the workpiece, for instance, for purposes of evaluating the quality of the workpiece or the accuracy of the cutting operation, the tool and workpiece are moved relative to one another in a y- or an x-axis direction, as is evident upon comparison of FIG. 20 with FIG. 19. The tool need not take the form of a boring bar, but it is contemplated that other types of tools are possible.

An alternative boring bar 257 shown in FIGS. 21 and 22 also includes a boring bar insert 258 and a nozzle 255 with an internal fluid path 260. In this embodiment, however, the nozzle 255 is disposed at an oblique angle with respect to the terminal radial point 262 of the boring bar insert 258. The tool may be employed as described heretofore with respect to FIGS. 18-20. Alternatively, fluid may be dispensed through the nozzle 255 during the boring operation. It is contemplated that, in such embodiments, the tool will remain stationery relative to the base of the machine and the workpiece will rotate, although in some embodiments it is contemplated that rotation of the tool relative to the base of the machine may occur during the measuring operation.

Figure 23:
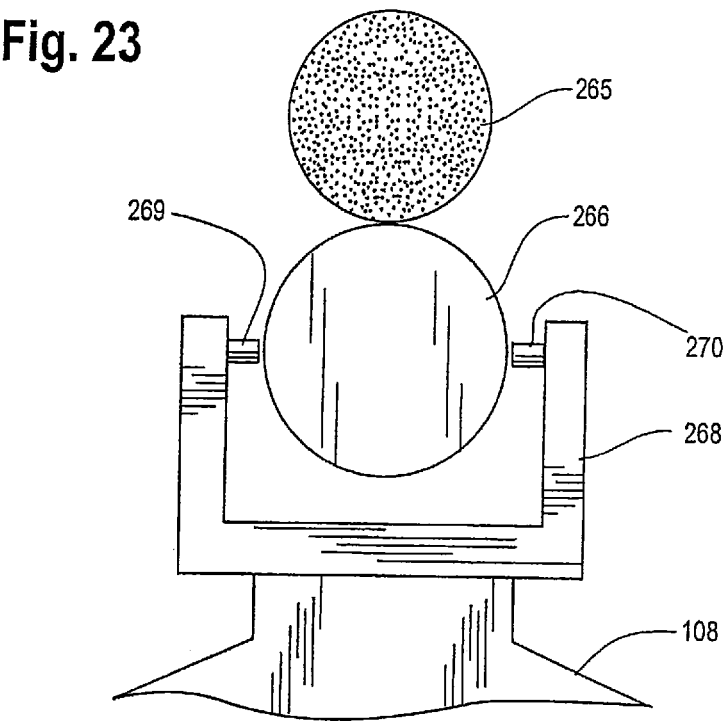
FIG. 23 is a view taken in the z-axis.
Figure 24:
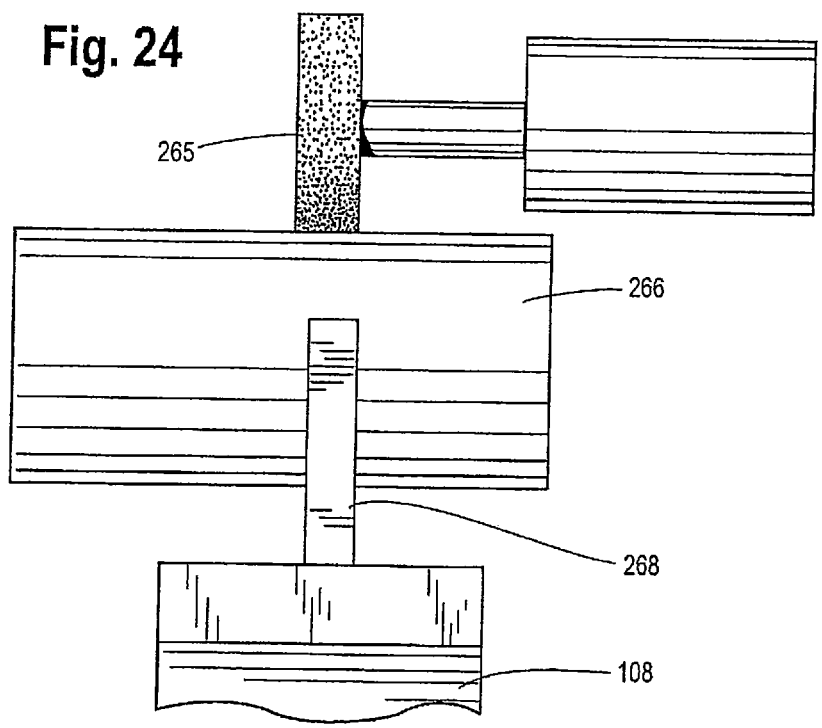
FIG. 24 a view taken in the y-axis, of a portion of the CNC machine shown in FIG. 1, illustrating an operation of simultaneous removal of material from a workpiece using a grinding wheel and measuring device of the workpiece.

As shown in FIGS. 23 and 24, a grinding operation includes a grinding wheel 265 operating to remove material from a workpiece 266 in combination with simultaneous measurements using a nozzle 268 with plural orifices 269, 270, the nozzle 268 being disposed on the turret 108 of the machine. It has been found that relative y-axis displacement of the nozzle 268 relative to the workpiece 266 in minor amounts does not affect the measuring operation. The measurement occurs simultaneously with the removal of material from the workpiece 266. In the embodiment, the machine may be programmed to cause removal of material from the workpiece until the measuring device determines that sufficient material has been removed from the workpiece. It is contemplated that the tool may remove material from the entire workpiece and cease removal of the material completely once the measuring device has reached this point, or, alternatively, the tool and workpiece may be moved relative to one another to cause removal of material at a different portion of the workpiece (for instance, by moving the grinding wheel 265 and workpiece 266 relative to one another in the z-direction).

The computer control system may be configured to facilitate simultaneous measurement and machining operations.

More specifically, the computer control system may include a dual channel control using separate command lines and axis synchronization codes for controlling the holders associated with the nozzle and the cutting tool.

In this embodiment, it is contemplated that there may be a period of delay between the time the desired measurement is reached and the disengagement of the tool and the workpiece. This delay, which may otherwise cause a workpiece to fall out of specification in high-precision applications, may be addressed by appropriate compensation in the measurement parameter. It is noted that the foregoing allows for very high precision in operations, irrespective of wear of the tool (for instance, wear of the grinding wheel 265). Even if the rate of wear of the tool is not known with certainty, a high-precision cutting operation is enabled.

In either embodiment, simultaneous measurement and removal of material from the workpiece may be employed to cause termination of the removal of material if a predetermined error limit has been reached. For instance, if the tool breaks during a cutting operation where a tool is traversing the workpiece, the measuring device will determine that there is a large and abrupt change in the measured dimension. The machine can be programmed to cause to tool to disengage from the workpiece in such instance. Also, particularly in a high-volume application, one or more workpieces may be out of specification, and the measuring device may be used to detect this and to cause a termination of the operation for a machine operator to take appropriate corrective action.

In another mode of operation, the measuring device is operated in a "skip signal" mode of operation. In this embodiment, the machine motion is terminated when a predetermined pressure has been reached, or alternatively another suitable action is taken. Pressure may be monitored continuously or may be sampled intermittently. This mode of operation is useful, for instance, in preventing contact with the nozzle with the form being measured. For instance, using a single orifice plug and a part where the user is not certain of the dimension to be measured, the skip signal mode of operation may be employed. The user may position the orifice at one limit of the estimated range of the part dimension, and then advance the nozzle towards the other limit of the estimated range. In a computer numerically controlled machine, this may be accomplished via a suitable machine program. The machine or controller program would continuously monitor or periodically sample pressure in the line. As the gap between the orifice and the part reduces, the pressure in the line will increase. The machine movement then can be stopped by issuing a skip signal when the pressure in the line receives a predetermined limit.

Generally, while the measuring apparatus has been shown in connection with a CNC machine that employs a turret, spindle, and plural chucks, the measuring device may be used in simpler CNC machines, or, more conversely in more complex such machines.

In practice, the measuring device has proven to allow for excellent accuracy and repeatability. In one embodiment, a bore having an interior diameter of roughly 3.5 inches was measured in a measuring operation. Thirty measurement readings were taken and were found to be consistent over a measurement range of 77 millionths of an inch (approximately 2 microns). Operation at a constant volumetric flow rate is believed to be advantageous over system described in the prior '797 patent and to be simpler in operation over the prior system.

All references, including publications, patent applications, and patents, cited herein are hereby incorporated by reference. The description of certain embodiments as "preferred" embodiments, and other recitation of embodiments, features, or ranges as being preferred, is not deemed to be limiting, and the claims are intended to encompass embodiments that are presently deemed to be less preferred. All methods described herein can be performed in any suitable order unless otherwise indicated herein or otherwise clearly contradicted by context. The use of any and all examples, or exemplary language (e.g., "such as") provided herein, is intended to illuminate the claimed subject matter and does not pose a limitation on claim scope unless otherwise claimed. Any statement herein as to the nature or benefits of the claimed subject matter, or of the preferred embodiments, is not intended to be limiting, and the appended claims should not be deemed to be limited by such statements. More generally, no language in the specification should be construed as indicating any non-claimed element as being essential to the practice of the claimed subject matter. The claims are intended to cover all modifications and equivalents of the subject matter recited therein as permitted by applicable law. Moreover, any combination of the above-described elements in all possible variations thereof is encompassed by the claims unless otherwise indicated herein or otherwise clearly contradicted by context.

The description herein of any reference or patent, even if identified as "prior," is not intended to constitute a concession that such reference or patent is available as prior art against the present disclosure.

All references, including publications, patent applications, and patents, cited herein are hereby incorporated by reference. The description of certain embodiments as "preferred" embodiments, and other recitation of embodiments, features, or ranges as being preferred, is not deemed to be limiting, and the claims are deemed to encompass embodiments that may presently be considered to be less preferred. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. The description herein of any reference or patent, even if identified as "prior," is not intended to constitute a concession that such reference or patent is available as prior art against the present disclosure.

What is claimed is:

1. An apparatus for obtaining information about a workpiece comprising:
   a first holder configured to support the workpiece;
   a second holder movable relative to the first holder;
   a measuring device including:
       a source including substantially incompressible fluid;
       a nozzle disposed in the second holder and extending along a longitudinal axis, the nozzle defining a first orifice fluidly communicating with the source;

a fluid monitoring apparatus associated with the measuring device for monitoring a parameter of the substantially incompressible fluid and generating electronic information indicative of fluid pressure at the orifice; and a pump fluidly coupled to the source and configured to supply incompressible fluid to the first orifice, the pump comprising a first pump speed for generating a first fluid flow through the nozzle having a substantially constant first volumetric rate; and a computer control system operatively coupled to the first holder, the second holder, the fluid monitoring apparatus, and the pump, and including a computer readable medium having disposed thereon executable code which, when executed, is configured to:

cause relative movement between the first and second holders to place the nozzle in a measurement position relative to the workpiece;

operate the pump at the first pump speed when the nozzle is in the measurement position; and obtain a first measurement reading based on the electronic information from the fluid monitoring apparatus while the pump operates at the first pump speed and the nozzle is in the measurement position.

2. The apparatus of claim 1, in which the pump further comprises a second pump speed for generating a second fluid flow through the nozzle having a substantially constant second volumetric rate.

3. The apparatus of claim 1, in which the measuring device is configured to conduct multiple readings in a single measuring operation, and in which the computer control system further includes an algorithm for calculating a quantitative value associated with the parameter of the substantially incompressible fluid based on the multiple readings.

4. The apparatus of claim 3, in which the algorithm is further configured to disregard starting high and low readings to obtain a set of remaining readings, and calculate a mean average of the remaining readings to obtain an average quantitative value associated with the parameter.

5. The apparatus of claim 1, in which the nozzle further includes a second orifice in fluid communication with the source, in which the first and second orifices are disposed on respective first and second nozzle surfaces, and in which each of the first and second nozzle surfaces is disposed at an oblique angle with respect to the nozzle longitudinal axis.

6. The apparatus of claim 1, in which the measuring device is further configured to terminate fluid flow at a predetermined threshold pressure.

7. An apparatus for obtaining information about a workpiece comprising:

a first holder configured to support the workpiece;

a second holder movable relative to the first holder;

a measuring device including:

a source including substantially incompressible fluid;

a nozzle coupled to the second holder, the nozzle defining a first nozzle conduit fluidly communicating between a first nozzle inlet and a first nozzle orifice, and a second nozzle conduit fluidly communicating between a second nozzle inlet and a second nozzle orifice, the first nozzle conduit being separate from the second nozzle conduit, wherein the first nozzle inlet is spaced from the second nozzle inlet;

an adapter slidably coupled to the nozzle, the adapter including an adapter conduit having an adapter inlet fluidly communicating with the source and an adapter outlet, the adapter movable between a first position, in which the adapter outlet fluidly communicates with the first nozzle inlet, and a second position, in which the adapter outlet fluidly communicates with the second nozzle inlet;

a fluid monitoring apparatus associated with the measuring device for monitoring a parameter of the substantially incompressible fluid and generating electronic information indicative of fluid pressure at the first and second orifices; and a pump fluidly coupled to the source and configured to supply incompressible fluid to the adapter inlet, the pump comprising a first pump speed for generating a first fluid flow through the nozzle having a substantially constant first volumetric rate; and a computer control system operatively coupled to the first holder, the second holder, the adapter, the fluid monitoring apparatus, and the pump, and including a computer readable medium having disposed thereon executable code which, when executed, is configured to:

cause relative movement between the first and second holders to place the nozzle in a measurement position relative to the workpiece;

place the adapter in the first position;

operate the pump at the first pump speed when the nozzle is in the measurement position to discharge the substantially incompressible fluid through the first nozzle orifice; and obtain a first measurement reading based on the electronic information from the fluid monitoring apparatus while the pump operates at the first pump speed and the nozzle is in the measurement position.

8. The apparatus of claim 7, in which the first nozzle conduit includes a plurality of first nozzle orifices in fluid communication with the first nozzle inlet.

9. The apparatus of claim 8, in which the second nozzle conduit includes a plurality of second nozzle orifices in fluid communication with the second nozzle inlet.

10. The apparatus of claim 9, in which the nozzle includes a head having a first section disposed at a first radial distance from the longitudinal axis and a second section disposed at a second radial distance from the longitudinal axis, and in which the plurality of first nozzle orifices is disposed in the nozzle head first section and the plurality of second nozzle orifices is disposed in the nozzle head second section.

11. The apparatus of claim 7, in which the nozzle includes a body defining a longitudinal axis, and in which the adapter is configured to slidably receive the nozzle body to permit movement of the adapter relative to the nozzle along the longitudinal axis.

12. The apparatus of claim 7, in which the pump further comprises a second pump speed for generating a second fluid flow through the nozzle having a substantially constant second volumetric rate, and in which the executable code is further configured to:

place the adapter in the second position after obtaining the first measurement reading;

operate the pump at the second speed with the nozzle remaining in the measurement position to discharge the substantially incompressible fluid through the second nozzle orifice; and obtain a second measurement reading based on the electronic information from the fluid monitoring apparatus.

13. A method of obtaining information about a workpiece as the workpiece is machined, comprising:

providing a measuring device having a source of substantially incompressible fluid, a nozzle defining an orifice in fluid communication with the source, a fluid monitoring apparatus for monitoring a parameter of the substantially incompressible fluid and generating electronic information indicative of fluid pressure at the orifice, and a pump fluidly coupled to the source and configured to supply incompressible fluid at a first pump speed for generating a first fluid flow to the orifice having a substantially constant first volumetric rate;

providing a cutting tool configured to remove material from the workpiece;

securing the workpiece in a first holder;

securing the nozzle in a second holder;

securing the cutting tool in a third holder, wherein the second and third holders are supported for movement relative to the first holder;

performing a measurement operation including:
    moving the second holder relative to the first holder to place the nozzle in a measurement position relative to the workpiece;
    operating the pump at the first pump speed when the nozzle is in the measurement position to disperse incompressible fluid from the source through the orifice to contact the workpiece, wherein the fluid is dispersed through the nozzle at the first volumetric rate; and
    obtaining a first measurement reading based on the electronic information from the fluid monitoring apparatus while the pump operates at the first pump speed and the nozzle is in the measurement position; and performing a machining operation simultaneously with the measurement operation, the machining operation including:
    moving the third holder relative to the first holder to place the cutting tool in contact with the workpiece; and
    moving at least one of the first holder and the third holder so that the cutting tool removes material from the workpiece.

14. The method of claim 13, further comprising providing a computer control system operatively coupled to the first holder, the second holder, and the third holder and including a computer readable medium having disposed thereon executable code which, when executed, is configured to cause relative movement of the first holder, the second holder, and the third holder.

15. The method of claim 14, in which the fluid monitoring apparatus is communicatively coupled to the computer control system.

16. The method of claim 14, in which the computer control system includes a first control channel configured to operate the second holder and a second control channel configured to operate the third holder.

17. The apparatus of claim 2, in which the executable code is further configured to:
    operate the pump at the second pump speed after obtaining the first measurement reading; and
    obtain a second measurement reading based on the electronic information from the fluid monitoring apparatus while the pump operates at the second pump speed.

18. The apparatus of claim 17, in which the executable code is further configured to cause relative movement between the first and second holders to place the nozzle in a second measurement position relative to the workpiece prior to obtaining the second measurement reading.

19. The apparatus of claim 7, in which the executable code is further configured to:
    place the adapter in the second position after obtaining the first measurement reading;
    operate the pump with the nozzle remaining in the measurement position to discharge the substantially incompressible fluid through the second nozzle orifice; and
    obtain a second measurement reading based on the electronic information from the fluid monitoring apparatus.

* * * * *